(No Model.)
G. T. McLAUTHLIN & J. NAYLOR, Jr.
RECORDING SPEED INDICATOR AND ALARM.
No. 506,406. Patented Oct. 10, 1893.
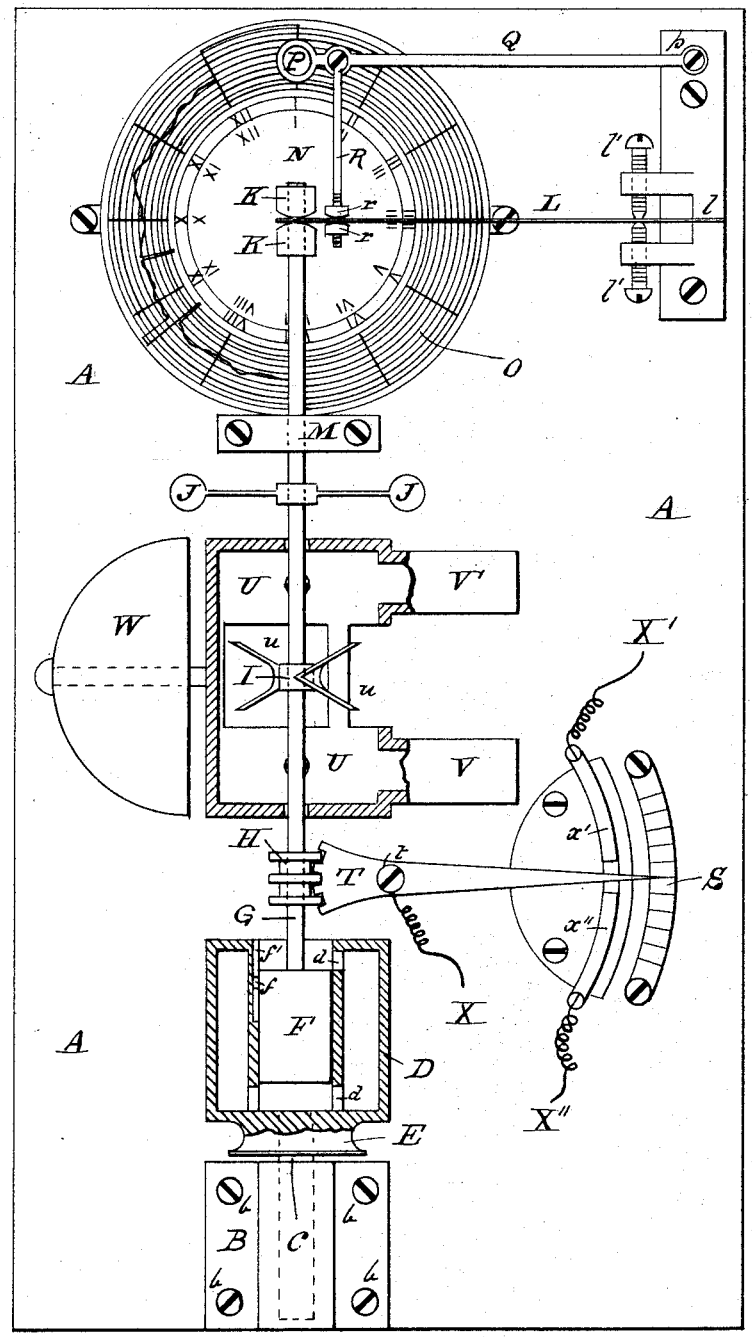
WITNESSES:
Harriet E. Richards.
A. Kenny
INVENTORS
George Thomas McLauthlin
James Naylor Jr
BY
ATTORNEY.

UNITED STATES PATENT OFFICE.

GEORGE T. McLAUTHLIN AND JAMES NAYLOR, JR., OF BOSTON, MASSACHUSETTS.

RECORDING SPEED-INDICATOR AND ALARM.

SPECIFICATION forming part of Letters Patent No. 506,406, dated October 10, 1893.

Application filed January 4, 1892. Serial No. 416,993. (No model.)

*To all whom it may concern:*

Be it known that we, GEORGE THOMAS MC-LAUTHLIN and JAMES NAYLOR, Jr., both citizens of the United States, and residents of Boston, in the county of Suffolk and State of Massachusetts, have invented certain new and useful Improvements in a Speed-Recorder, Alarm, and Indicator, of which the following, taken in connection with the accompanying drawing, is a specification.

Our improvements relate to an indicator that appeals to the sense of hearing, its object being to give a continual knowledge of what the speed is without having to depend on sight.

It consists of a novel arrangement of parts so operating together that they run noiselessly when a normal speed is maintained; but on the least variation from the normal speed it becomes noisy to such a degree that the speed is indicated by the sound.

The drawing represents a general elevation of the apparatus.

A A A is a board upon which all the parts are mounted.

B is a solid bearing box, secured to the board by the screws $b\ b\ b\ b$.

C is the arbor, upon which is mounted the drum D with the pulley E, by which power is applied to run it. The drum D has a central and annular chamber with communicating holes $d\ d$ at the top and bottom as shown. Enough mercury is put into it to exactly fill the annular chamber and the communicating openings $d\ d$. Fitting loosely into the central chamber is the float F provided with a pin $f$ working freely in the vertical groove $f'$. This insures the turning of the float with the drum and allows of a free vertical movement at the same time. Secured to the float F is the small vertical shaft G, and attached thereto in proper positions, are the rack H, the propeller I, the hammers J J and the collars K K. The propeller I has double-deflecting wings or blades to displace the air from the plane of its revolutions and force it both upward and downward. The diameters of the blades are such as to admit same into the openings $u\ u$ of the chambers U U when the shaft G is raised or lowered.

L is a spring, held rigid at $l$ and vertically adjustable by means of the set screws $l'\ l'$. This spring L supports the super-incumbent weight of the shaft G and the parts secured to it; it also affords a ready means of extreme and delicate adjustment to balance the mechanical effect produced by the natural forces. It is held to the shaft G by the collars K K above and below it, which admits of its freedom to revolve.

M is a solid bearing box secured to the board, to hold the upright shaft G.

N is a clock secured to the board, the face of which has one revolution in twelve hours.

O is a chart attached to the face of the clock and therefore has the same movement. The radial division lines represent hours, the concentric divisions representing ten variations of speed; five above and five below normal speed.

P is a pencil, made to bear with sufficient pressure to mark by the holder Q pivoted at P, and connected to the spring L by the rod R, said rod being adjustable by means of set-nuts $r\ r$.

S is a segment having enlarged corresponding marks to what is shown on the chart O.

T is a copper pointer, pivoted at $t$, to the board, and engages with the rack H upon the shaft G, and indicates correspondingly upon the segment as the pencil does upon the chart.

U U is a cylindrical chamber having openings $u\ u$. These chambers are preferably cast in one piece, the upper and lower parts being connected together so as to leave air openings at the middle part or when the propeller I runs at normal speed. The openings $u\ u$ are of a diameter to admit the blades of the propeller. Other openings from the upper and lower chambers U U are air outlets to the whistles V and V'. These whistles are of any well known kind; but are of different pitch, so as to have a distinguishing sound, and are simply inserted into the air outlets.

W is an alarm bell held stationary and in such a position as to allow the hammers J J to strike it when the shaft and float are at their lowest point.

X is a copper wire connecting the pointer

T with the positive pole of an electric battery.

X' is a connecting wire from the adjustable plate $x'$ to the negative pole with an electro-magnetic alarm bell placed at any convenient place in the circuit.

X" is the connecting wire from the plate $x''$ to the negative pole with a distinguishing alarm bell in the circuit.

Its operation is as follows:—When the normal speed of the motor or machine has been determined, a speed is giving the revolving parts which causes them to assume the positions shown in the drawing. The pointer T and pencil upon the chart are alike at their normal marks. The propeller I running at this position causes no extra or reduced pressure in the chamber U, U, and therefore there is no whistling; the hammers J J are freely revolving clear of the bell and therefore no alarm; meanwhile the clock work is causing the slow movement of the chart, and a record is being made. When the speed diminishes from whatever cause, gravity exerts its influence over the centrifugal force, and the mercury flows into the central chamber of the drum causing the float F to rise, as also the shaft G and all the parts secured thereto. The propeller I enters the upper part of the chamber U and causes an undue pressure therein which sounds the whistle V' which being of low pitch indicates to the ear that the speed is below normal; the pencil is raised and makes its record upon the chart; and the pointer T falls and indicates correspondingly upon the segment; as the pencil does upon the chart. On an acceleration of speed the order is reversed; the propeller enters the lower part of the chamber U, and therein causes an undue pressure; the whistle V is sounded, which being of high pitch, indicates to the ear that the speed is above normal; the centrifugal effect has overcome gravity which causes the mercury to leave the central chamber and enter the annular chamber passing through the communicating openings $d$ $d$. When this state of things continues and all the mercury has left the central chamber, and the float is at its lowest point; then the hammers J J are brought in contact with the bell W, and a continual alarm is kept up, as long as these conditions exist.

The plates $x'$ $x''$ may be set at any point of the segment, so that the different circuits are closed by the movement of the pointer T, said pointer being a part of the electric circuit.

The drawing shows that the different electric alarms will sound when the variation of speed is either one degree above or below normal.

The record on the chart as shown in the drawing, shows a start at seven o'clock, the speed continuing fairly steady until about 8.40 when a sudden acceleration sounded the alarm and all came to a stop, and after a few minutes delay the speed started up again to normal, which is continued until 9.30 when another sudden acceleration is recorded, with a quick return to normal which continued fairly so until noon when the speed stopped and remained so until one o'clock when the speed again went to the normal point, and where the pencil is shown as marking.

We are aware that it is not new to so govern a pencil point upon a revolving or moving surface and so mark a line upon other regular division lines; such we do not claim; but, Having described our invention, what we claim as new, and desire to secure by Letters Patent, is—

1. In a speed indicator the drum D having an annular and central chamber with communicating openings, a float in the central chamber and having a revolving motion with said drum, in combination with a supporting liquid for said float; the whole mounted upon an arbor and driven by a pulley as shown.

2. In a speed recorder, or indicator, the chambers U U, having the openings $u$ $u$ and provided with whistles at the upper and lower outlets in combination with a propeller wheel having a revolving and vertical movement, as shown and described.

3. In a speed indicator and alarm, the shaft having a revolving and axial motion secured to the float and carrying the hammers J J in combination with a stationary alarm bell when so arranged that the axial motion brings the hammers J J in contact with said bell as shown and described.

4. In a speed recorder and indicator, the propeller I, having an axial or endwise and revolving motion in combination with a chamber and whistles connecting therewith, so as cause different sounds at the different positions of said propeller, as herein set forth.

5. In a speed recorder alarm and indicator the combination with the shaft G upon which are mounted the propeller I and hammers J J; of the chambers U U having connecting whistles, and the alarm bell W as and for the purpose set forth.

6. In a speed recorder the combination with the spring L having adjusting screws $l'$ $l'$ and loosely connected to the revoiving shaft G of the pencil holder Q, and connecting means to operate same therefrom, as shown and described.

7. In a speed indicator and alarm, the pointer T fulcrumed at $t$ and connected by the wire X to the positive pole of an electric battery, the adjustable plates $x'$ $x''$ having the negative wire connections X' X" to said battery, with an electro magnetic alarm bell placed in the circuit in combination with the rack H mounted upon the shaft having a revolving and axial motion as shown and described.

8. In a speed indicator and recorder, the combination with a pencil holder arranged to mark upon a paper blank moved by a time movement, of connecting mechanism to a float supported by a liquid within a bowl having a central and annular chamber with communicating openings to effect the axial movement of said shaft and like motion to the pencil holder as shown and described.

In testimony whereof we have signed our names to this specification, in the presence of two subscribing witnesses, on this 15th day of December, A. D. 1891.

GEO. T. McLAUTHLIN.
JAMES NAYLOR, JR.

Witnesses:
A. KENNY,
HARRIET E. RICHARDS.